(12) United States Patent
Kubo et al.

(10) Patent No.: US 12,420,590 B2
(45) Date of Patent: Sep. 23, 2025

(54) PNEUMATIC TIRE

(71) Applicant: Toyo Tire Corporation, Itami (JP)

(72) Inventors: Haruka Kubo, Itami (JP); Hirokazu Sakata, Itami (JP); Kensuke Shibayama, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 18/421,201

(22) Filed: Jan. 24, 2024

(65) Prior Publication Data

US 2024/0262133 A1    Aug. 8, 2024

(30) Foreign Application Priority Data

Feb. 2, 2023 (JP) .................. 2023-014754
Mar. 27, 2023 (JP) .................. 2023-049756

(51) Int. Cl.
 *B60C 11/00*    (2006.01)
 *B60C 11/03*    (2006.01)
 *B60C 11/04*    (2006.01)
 *B60C 11/12*    (2006.01)

(52) U.S. Cl.
 CPC ...... *B60C 11/0302* (2013.01); *B60C 11/0304* (2013.01); *B60C 11/0306* (2013.01); *B60C 11/04* (2013.01); *B60C 11/1204* (2013.01); *B60C 11/1236* (2013.01); *B60C 2011/0025* (2013.01); *B60C 2011/0353* (2013.01);
 (Continued)

(58) Field of Classification Search
 CPC ............ B60C 11/1204; B60C 11/0304; B60C 11/1236; B60C 11/04; B60C 2011/0386; B60C 2011/0025; B60C 2011/0353; B60C 2011/1295; B60C 2011/1213
 See application file for complete search history.

(56) References Cited

U.S. PATENT DOCUMENTS

2004/0256040 A1* 12/2004 Ratliff, Jr. ........... B60C 11/0306
152/DIG. 3
2005/0167019 A1*  8/2005 Puhala ................ B60C 11/0058
152/209.4
(Continued)

FOREIGN PATENT DOCUMENTS

DE    102015215015 A1    2/2016
JP       2005219733 A    8/2005
(Continued)

OTHER PUBLICATIONS

Machine translation for Japan 2018-090097 (Year: 2024).*
(Continued)

*Primary Examiner* — Steven D Maki
(74) *Attorney, Agent, or Firm* — Maier & Maier, PLLC (57) ABSTRACT

A pneumatic tire that is mounted on a vehicle in a specified direction and includes a tread rubber on a tread. The tread rubber has a plurality of main grooves extending along a tire circumferential direction, a pair of shoulder blocks that are defined by the main grooves and arranged on outer sides in a tire axial direction, and center blocks located between the pair of shoulder blocks. The center blocks are ribbed blocks that are continuous in the tire circumferential direction, and the tread rubber has a storage modulus at −25° C. (−25° C. E') of 60 MPa or more and 150 MPa or less.

4 Claims, 3 Drawing Sheets

(52) U.S. Cl.
CPC ............... *B60C 2011/0386* (2013.01); *B60C 2011/1213* (2013.01); *B60C 2011/1295* (2013.01)

(56) References Cited

U.S. PATENT DOCUMENTS

| | | | |
|---|---|---|---|
| 2015/0239296 A1* | 8/2015 | Fukuda | B60C 11/0041 152/209.5 |
| 2016/0039249 A1* | 2/2016 | Takahashi | B60C 11/0083 152/209.15 |
| 2016/0236517 A1 | 8/2016 | Nagase | |
| 2018/0154698 A1* | 6/2018 | Takahashi | B60C 11/1204 |
| 2024/0051338 A1* | 2/2024 | Kazariya | B60C 11/005 |

FOREIGN PATENT DOCUMENTS

| | | | | |
|---|---|---|---|---|
| JP | 2016150601 A | | 8/2016 | |
| JP | 2016182927 A | | 10/2016 | |
| JP | 2018-090097 A | * | 6/2018 | ......... B60C 11/0304 |
| JP | 2019077832 A | | 5/2019 | |
| WO | 2016109724 A1 | | 7/2016 | |

OTHER PUBLICATIONS

Extended European Search Report issued on Jun. 27, 2024, in corresponding European Application No. 24151860.4, 9 pages.
Office Action issued on Mar. 31, 2025, in corresponding European Application No. 24 151 860.4, 6 pages.

\* cited by examiner

PNEUMATIC TIRE

CROSS REFERENCE TO RELATED APPLICATION

This application claims priority to Japanese Patent Application Nos. 2023-014754 filed on Feb. 2, 2023, and 2023-049756 filed on Mar. 27, 2023, which are incorporated herein by reference in their entirety including the specification, claims, drawings, and abstract.

TECHNICAL FIELD

The present invention relates to a pneumatic tire and more particularly to a tire mounted on a vehicle in a specified direction.

BACKGROUND

A pneumatic tire having a tread with a plurality of main grooves extending in the circumferential direction of the tire and blocks defined by the main grooves has been widely known. The tire is mounted on a vehicle in a specified direction. The tire, for which the mounting direction to the vehicle is specified, generally has an asymmetrical tread pattern. For example, JP 2016-150601 A discloses a pneumatic tire having three main grooves extending in the tire circumferential direction, two center blocks defined by the three main grooves, and sipes formed in different patterns in each center block.

In addition, JP 2019-077832 A discloses using a polymer with a low glass transition temperature for rubber used for a tire tread, to lower the storage elastic modulus (E'), thereby achieving a tire with improved braking performance and gripping performance on snowy and icy roads (hereinafter referred to as snow performance).

SUMMARY

Using a polymer with a low glass transition point for rubber used for a tire tread leads to degradation of braking performance and grip performance on a wet road surface (hereinafter referred to as wet performance). It is thus not easy to improve snow performance while ensuring wet performance. For all-season tires, it is important to achieve a good balance between snow performance and wet performance.

An object of the present invention is to provide a pneumatic tire that can achieve both snow performance and wet performance in a well-balanced manner.

A pneumatic tire according to the present invention is a pneumatic tire that is mounted on a vehicle in a specified direction and has a tread rubber on its tread. The tread rubber has a plurality of main grooves extending along a tire circumferential direction, a pair of shoulder blocks that are defined by the main grooves and arranged on outer sides in a tire axial direction, and center blocks located between the pair of shoulder blocks. The center blocks are ribbed blocks continuous in the tire circumferential direction. The tread rubber has a storage modulus at −25° C. (−25° C. E') of 60 MPa or more and 150 MPa or less.

A pneumatic tire according to the present invention can achieve both snow performance and wet performance in a well-balanced manner.

BRIEF DESCRIPTION OF DRAWINGS

Embodiments of the present disclosure will be described based on the following figures, wherein.

DETAILED DESCRIPTION OF EMBODIMENTS

Embodiments of a pneumatic tire according to the present invention will be described in detail with reference to the drawings. The embodiments described below are merely an example, and the present invention is not limited to the embodiments. In addition, selective combinations of components of the embodiments described below are included in the invention.

Figure 1:
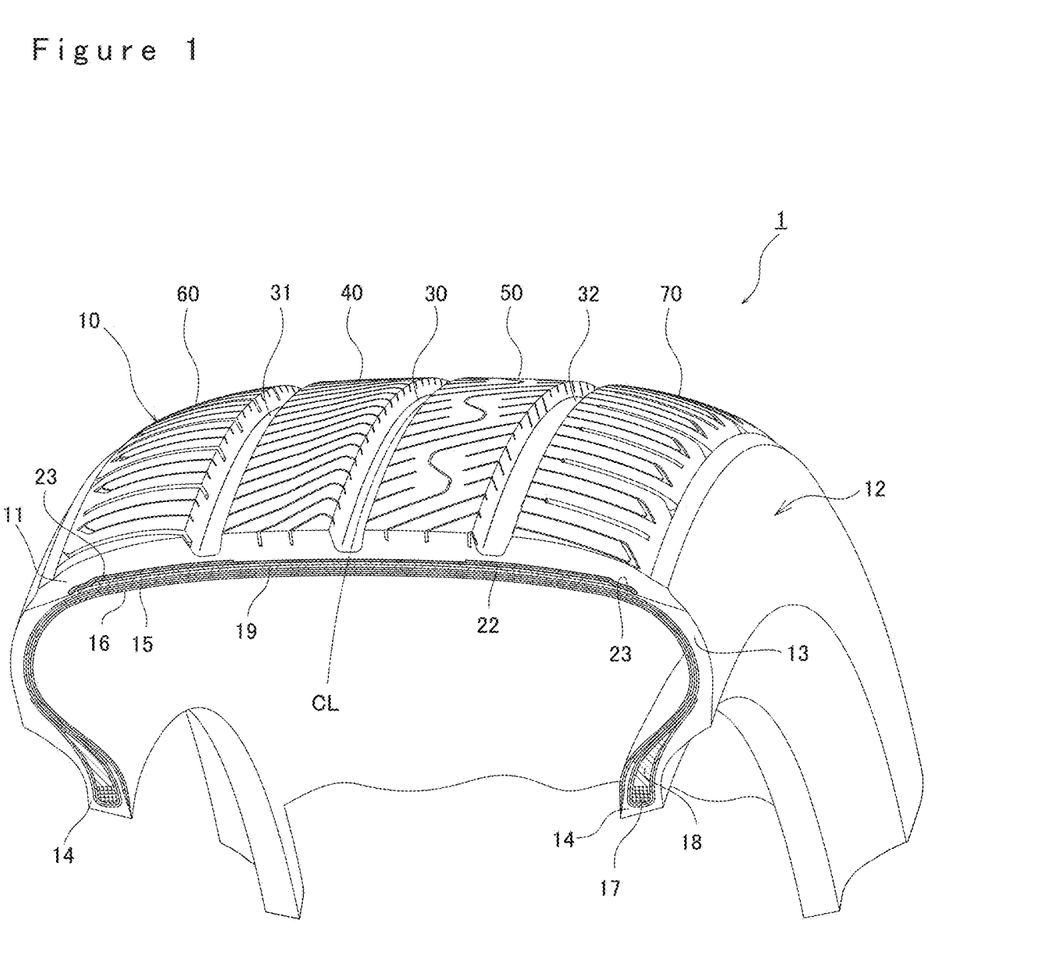
FIG. 1 is a perspective view showing a pneumatic tire according to an embodiment.

FIG. 1 is a perspective view showing a pneumatic tire 1 according to an embodiment. FIG. 1 also shows an internal structure of the pneumatic tire 1. As shown in FIG. 1, the pneumatic tire 1 includes a tread 10 that is a part contacting a road surface, a pair of sidewalls 12 arranged on both sides of the tread 10, a pair of beads 14 arranged on the inside of the sidewalls 12 in a tire radial direction, a carcass 15 hung between the pair of beads 14, and an inner liner 16 located on the inside of the carcass 15 in the tire radial direction.

The pneumatic tire 1 is a tire mounted on a vehicle in a specified direction. Thus, on the right and left sides of the vehicle, the pneumatic tires 1 are mounted in opposite directions. The tread 10 has an asymmetrical tread pattern with respect to a tire equator CL (see FIG. 2). The equator CL is an imaginary line extending along a tire circumferential direction at the center of the tread 10 in a tire axial direction. Hereinafter, the terms "right" and "left" will be used for convenience of explanation. These term mean right and left in the traveling direction of the vehicle on which the pneumatic tire 1 is mounted.

The tread 10 is made of tread rubber 11. In the present embodiment, the tread 10 has a main groove 30 (center main groove) formed on the tire equator CL and a pair of main grooves 31 and 32 (shoulder main grooves). The three main grooves 30, 31, and 32 are formed straight along the tire circumferential direction without being curved in the tire axial direction.

The tread 10 has a center block 40 (first center block) defined by the main grooves 30 and 31, and a center block 50 (second center block) defined by the main grooves 30 and 32. The tread 10 also has a shoulder block 60 (first shoulder block) located to face the first center block 40 in the tire axial direction with the shoulder main groove 31 in between, and a shoulder block 70 (second shoulder block) located to face the second center block 50 in the tire axial direction with the shoulder main groove 32 in between. The blocks are formed straight along the tire circumferential direction. Each of the blocks is a portion that rises outward in the tire radial direction from a position corresponding to the bottom of the main grooves, and is also referred to as a land.

The bead 14 is a portion that is located on the inside of the sidewall 12 in the tire radial direction and fixed to a wheel rim. The bead 14 has a bead core 17 and bead filler 18. The bead core 17 is an annular member composed of a steel bead wire and extends around the entire circumference of the tire in the circumferential direction. The bead core 17 is embedded in the bead 14. The bead filler 18 is an annular hard rubber member that has a tapered tip extending outward in the tire radial direction and extends around the entire circumference of the tire.

The carcass 15 is hung between the pair of beads 14. It is folded around the bead core 17 and locked in place. The carcass 15 includes carcass cords made of organic fibers and a topping rubber. The carcass cords are arranged at substantially right angles (for example, 80° to 90°) to the tire circumferential direction. The organic fibers used for the carcass cords include, for example, polyester fiber, rayon fiber, aramid fiber, and nylon fiber.

The inner liner 16 covers an inner surface of the tire between the pair of beads 14. The inner liner 16 is made of air permeation resistant rubber and serves to maintain the air pressure of the pneumatic tire 1.

The pneumatic tire 1 further includes a belt 19 located on the outside of the carcass 15 in the tire radial direction, a cap ply 22 that covers the entire outside of the belt 19 in the tire radial direction, and an edge ply 23 located on the outside of the cap ply 22 in the tire radial direction and that covers both ends of the belt 19 in the tire axial direction. The cap ply 22 and the edge ply 23 serve to reinforce the belt 19.

The belt 19 is provided on the outer circumferential side of a top of the carcass 15 so as to overlap an outer circumferential surface of the carcass 15. The belt 19 is composed of belt plies that are rubber-coated cords arranged in a direction oblique to the tire circumferential direction. The material of the cords of the belt 19 is not particularly limited, and organic fibers, such as polyester, rayon, nylon, and aramid, or metals, such as steel, may be used. In the present embodiment, the belt 19 is composed of two belt plies including steel cords. The number of belt plies is not particularly limited, and one or three or more belt plies may be used.

Hereinafter, a tire tread rubber composition (hereinafter simply referred to as a rubber composition) constituting the tread rubber 11 will be explained in detail.

The rubber composition of the present invention has a storage modulus at −25° C. (−25° C. E') of 60 MPa or more and 150 MPa or less. When −25° C. E' is within this range, using that rubber composition for the tread rubber 11 having a tread pattern described below makes it possible to achieve both wet performance and snow performance in a well-balanced manner. In other words, when −25° C. E' is less than 60 MPa, the grip force with the road surface will decrease, and wet performance will deteriorate. In addition, when −25° C. E' is more than 150 MPa, snow performance will deteriorate. In the present invention, −25° C. E' is a value obtained by measuring the rubber composition which has been subjected to a vulcanization process, by using a method described in examples, at a temperature of −25° C., initial strain of 10%, dynamic strain of 1%, and frequency of 10 Hz.

The lower limit of −25° C. E' of the rubber composition may be 60 MPa, preferably 70 MPa, and more preferably 80 MPa. Further, the upper limit of −25° C. E' of the rubber composition may be 150 MPa, preferably 140 MPa, and more preferably 130 MPa. By setting the upper and lower limits in this way, it becomes easy to achieve both wet performance and snow performance.

The rubber composition includes a rubber component containing styrene-butadiene-based rubber and isoprene-based rubber. The rubber composition containing these two types of rubber can achieve improved workability as well as exhibit the advantageous effects of the present invention.

The styrene-butadiene-based rubber is not particularly limited as long as it is rubber containing styrene units and butadiene units, and may be, for example, emulsion-polymerized styrene-butadiene rubber (E-SBR) and solution-polymerized styrene-butadiene rubber (S-SBR). In the styrene-butadiene-based rubber, the total content of styrene units and butadiene units in 100 parts by mass of rubber may be, for example, 95 parts by mass or more, 98 parts by mass or more, or 100 parts by mass. Although one type of the styrene-butadiene-based rubbers may be used alone, it is preferable to use two or more types in combination.

Although the styrene-butadiene-based rubber may be unmodified SBR or may be modified SBR, it is preferable that it contains modified SBR. By containing modified SBR, it is possible to reduce rolling resistance and achieve good fuel economy. In the present specification, a "modified" rubber component refers to a rubber component having a functional group reactive with silica, while an "unmodified" rubber component refers to a rubber component having no functional group reactive with silica. The functional group reactive with silica includes, for example, a hydroxyl group, amino group, carboxyl group, alkoxy group, alkoxysilyl group, and epoxy group. The functional group reactive with silica may be introduced to the molecular end or into the molecular chain.

As the styrene-butadiene-based rubber, for example, SBRs manufactured and sold by Sumitomo Chemical Company Limited, ENEOS Material Corporation, Asahi Kasei Corp., Zeon Corporation may be used.

In the above rubber composition, the content of styrene-butadiene-based rubber in 100 parts by mass of the rubber component is preferably 30 parts by mass or more, more preferably 40 parts by mass or more, and even more preferably 50 parts by mass or more. Good steering stability can be obtained by setting the content of styrene-butadiene-based rubber to 30 parts by mass or more. In addition, the content of styrene-butadiene-based rubber is preferably 80 parts by mass or less. Although there is a concern that workability may deteriorate when a large amount of styrene-butadiene-based rubber is used, such deterioration can be reduced by controlling the content of styrene-butadiene-based rubber to 80 parts by mass or less. Thus, a suitable range for the content of the styrene-butadiene-based rubber is, for example, 30 parts by mass or more and 80 parts by mass or less.

The glass transition temperature (Tg) of styrene-butadiene-based rubber is preferably −70° C. or more and −20° C. or less because the advantageous effects of the present invention can be obtained satisfactorily within this range. Here, the glass transition temperature of styrene-butadiene-based rubber is measured by using the differential scanning calorimetry (DSC) method in accordance with JIS K7121, at a temperature rising rate of 20° C./min (measurement temperature range: −150° C. to 50° C.).

Although rubbers commonly used in the tire industry, such as isoprene rubber (IR) and natural rubber, may be used as the isoprene-based rubber, natural rubber is more preferable from the viewpoint of improving snow performance. Natural rubber includes not only unmodified natural rubber (NR) but also modified natural rubber, such as epoxidized natural rubber (ENR), hydrogenated natural rubber (HNR), deproteinized natural rubber (DPNR), high purity natural rubber (UPNR), and grafted natural rubber. These rubbers may be used alone or in combination of two or more.

In the above rubber composition, the content of isoprene-based rubber in 100 mass parts of the rubber component is preferably 15 parts by mass or more, more preferably 20 parts by mass or more, and even more preferably 25 parts by mass or more.

In addition to the styrene-butadiene-based rubber and the isoprene-based rubber, the rubber component may include other rubber components. The other rubber components include, for example, butadiene-based rubber (BR), ethylene propylene diene rubber (EPDM), chloroprene rubber (CR), acrylonitrile butadiene rubber (NBR), butyl rubber (IIR), and other diene rubbers. These rubber components may be used alone or in combination of two or more.

The butadiene-based rubber (BR) is not particularly limited as long as it is a polymer containing butadiene units as its main unit. For example, BR with high cis content, BR with low cis content, and the like may be used. They may be used alone or in combination of two or more.

In the present embodiment, carbon black and silica are used as reinforcing fillers.

The carbon black is not limited to any particular type, and a variety of known types of carbon black may be used. For example, it is preferable to use carbon black having a nitrogen adsorption specific surface area ($N_2SA$) (JIS K6217-2) of 70 to 150 $m^2/g$. Specifically, carbon black of SAF class (N100 series), ISAF class (N200 series), and HAF class (N300 series) may be used. Carbon black in these grades may be used alone or in combination of two or more.

The blending amount of carbon black is preferably less than 10 parts by mass, and more preferably less than 8 parts by mass, with respect to 100 parts by mass of the rubber component. By reducing the blending amount of carbon black, it is possible to reduce the hardness of the rubber composition and improve noise performance. The lower limit of the blending amount of carbon black is, for example, more than 2 parts by mass. Thus, an example of a suitable range for the blending amount of carbon black is more than 2 parts by mass and less than 10 parts by mass, and more preferably more than 2 parts by mass and less than 8 parts by mass.

The silica is not limited to any particular type, and, for example, wet silica, such as wet precipitation silica and wet gel silica, may be used. The BET specific surface area of silica (measured according to the BET method described in JIS K6430) is not particularly limited, and may be, for example, 90 to 250 $m^2/g$ or 150 to 220 $m^2/g$.

The blending amount of silica is preferably more than 60 parts by mass, more preferably 65 parts by mass or more, with respect to 100 parts by mass of the rubber component. Wet performance is improved by setting the blending amount of silica to be more than 60 parts by mass. The blending amount of silica is preferably less than 90 parts by mass, and more preferably 85 parts by mass or less. Rolling resistance is reduced by setting the blending amount of silica to be less than 90 parts by mass. Thus, a suitable range for the blending amount of silica is, for example, more than 60 parts by mass and less than 90 parts by mass.

In addition to the above-mentioned components, the rubber composition according to the present embodiment may contain various additives commonly used in rubber compositions for tire treads, such as, for example, silane coupling agents, stearic acid, zinc oxide, waxes, anti-aging agents, oils, vulcanization accelerators, and vulcanizing agents.

Known silane coupling agents, such as sulfide silane and mercaptosilane, may be used as the silane coupling agents. Although the blending amount of the silane coupling agent is not particularly limited, it is preferably 2 parts by mass or more and 20 parts by mass or less of the blending amount of silica, and more preferably 5 parts by mass or more and 15 parts by mass or less of the blending amount of silica.

Various oils that are commonly blended into a rubber composition may be used as the oils. For example, at least one mineral oil selected from a group consisting of paraffin oil, naphthenic oil, and aromatic oil may be used. The content of oil is not particularly limited, and may be, for example, 40 parts by mass or less, or 30 parts by mass or less with respect to 100 parts by mass of the rubber component.

Sulfur is preferably used as the vulcanizing agent. The blending amount of the vulcanizing agent is not particularly limited and may be, for example, 0.1 parts by mass or more and 5 parts by mass or less, or 0.5 parts by mass or more and 3 parts by mass or less, with respect to 100 parts by mass of the rubber component.

Various types of vulcanization accelerators, such as sulfenamide type, thiuram type, thiazole type, and guanidine type, may be used as the vulcanization accelerator. These vulcanization accelerators may be used alone or in combination of two or more. The blending amount of the vulcanization accelerator is not particularly limited and may be, for example, 0.1 parts by mass or more and 5 parts by mass or less, or 0.5 parts by mass or more and 3 parts by mass or less, with respect to 100 parts by mass of the rubber component.

The rubber composition according to the present embodiment can be produced by kneading according to a conventional method by means of a commonly used mixer, such as a Banbury mixer, a kneader, or a roll. Specifically, for example, in the first mixing stage (non-productive kneading step), additives other than the vulcanizing agent and the vulcanization accelerator are added and mixed into the rubber component together with carbon black and silica. Then, in the final mixing stage (productive kneading step), the vulcanizing agent and the vulcanization accelerator may be added and mixed with the resulting mixture from the first mixing step to thereby prepare an unvulcanized rubber composition.

The non-productive kneading step may be performed as a single mixing step, or may be divided into a plurality of mixing steps in which mixing and discharging are repeated. For example, the non-productive kneading step may include a first non-productive kneading step in which the entire amount of the rubber component and carbon black is mixed with part of silica and the silane coupling agent, and a second non-productive kneading step in which part of silica and the silane coupling agent and the entire amount of zinc oxide and anti-aging agent are mixed into the mixture from the first non-productive kneading step. By carrying out the mixing process in the plurality of steps, it is possible to form a uniform chemical bond between the fillers and the polymer.

Figure 2:
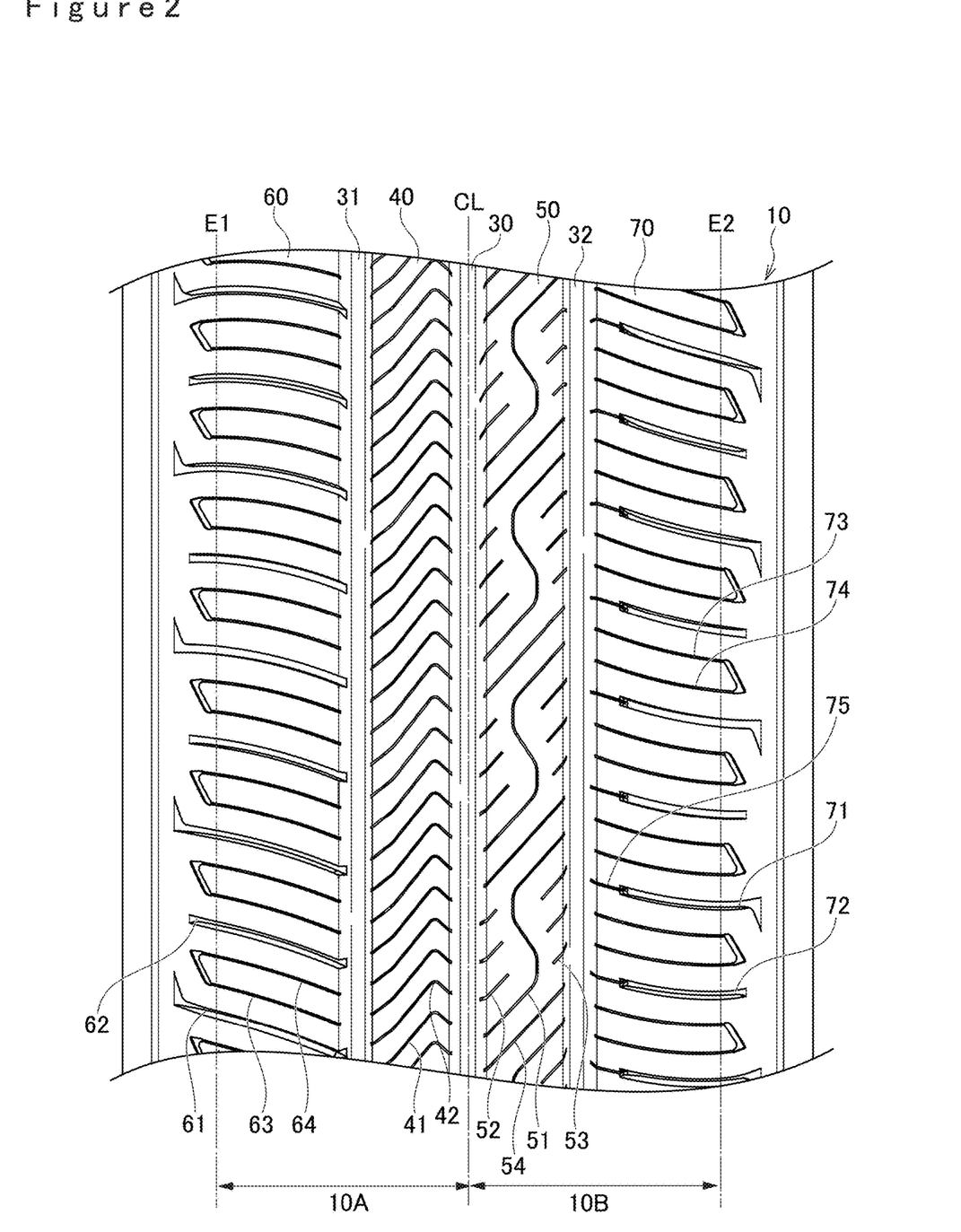
FIG. 2 is an enlarged plan view of a part of a tread of the pneumatic tire according to the embodiment.

Hereinafter, the tread pattern of the pneumatic tire 1 will be described in detail with reference to FIG. 2. FIG. 2 is a plan view showing the pneumatic tire 1 (tread 10).

As shown in FIG. 2, the tread 10 has an asymmetrical tread pattern with respect to a tire equator CL. Hereinafter, an area closer to a ground contact end E1 than the tire equator CL will be referred to as a first area 10A, and an area closer to a ground contact end E2 than the tire equator CL will be referred to as a second area 10B. In the present specification, the "ground contact ends E1 and E2" are defined as both ends of an area of the tire that contacts a flat road surface (ground contact area) in the tire axial direction when the unused pneumatic tire 1 is mounted on a regular rim and inflated to a regular internal pressure and a predetermined load is applied thereto. In the case of a passenger car tire, the predetermined load is a load equivalent to 88% of a regular load. The tread pattern of the pneumatic tire 1 exhibits the advantageous effects of the present invention when the tire is mounted on the vehicle such that the first region 10A is located on the inner side of the vehicle and the second region 10B is located on the outer side of the vehicle.

The tread 10 has the center main groove 30 formed on the tire equator CL, the shoulder main groove 31 formed between the tire equator CL and the ground contact end E1 on the inner side of the vehicle, the shoulder main groove 32 formed between the tire equator CL and the ground contact end E2 on the outer side of the vehicle, and a plurality of blocks defined by the three main grooves 30, 31, and 32. The number of main grooves is not limited to three, and may be two, or four or more.

The shoulder main grooves 31 and 32 are preferably formed at the same distance from the tire equator CL (center main groove 30). This makes it possible to achieve good rigidity balance between the left and right regions that have the tire equator CL as a boundary, thereby exhibiting the advantageous effects of the present invention more clearly.

The total width of the three main grooves 30, 31, and 32 is preferably 3% or more, more preferably 5% or more, and even more preferably 8% or more of the length from the ground contact end E1 to the ground contact end E2 along the tire axial direction (hereinafter referred to as "tire ground contact width"). This improves drainage performance and enhances wet performance significantly. Further, the total width of the three main grooves 30, 31, and 32 is preferably 30% or less, more preferably 28% or less, and even more preferably 25% or less of the tire ground contact width. This ensures excellent steering stability. Thus, a suitable range for the total width of the three main grooves 30, 31, and 32 is, for example, 5% or more and 30% or less of the tire ground contact width. Further, when more emphasis is placed on improving wet performance, the total width of the three main grooves 30, 31, and 32 may be 10% or more and 30% or less of the tire ground contact width. In the present specification, the width of the groove means the width of the groove on the profile surface along the ground contact surface of the tread 10, unless otherwise specified.

The width of the shoulder main grooves 31 and 32 is preferably greater than the width of the center main groove 30 formed on the tire equator CL. This improves drainage performance and enhances wet performance. The width of the center main groove 30 is, for example, 8 mm or more and 14 mm or less, and the width of the shoulder main grooves 31 and 32 is, for example, 9 mm or more and 15 mm or less. The depth of the three main grooves 30, 31, and 32 is not particularly limited, and is, for example, 7 mm or more and 15 mm or less.

At least one of the three main grooves 30, 31, and 32 is typically provided with a wear indicator (not shown). The wear indicator is a protrusion located at the bottom of the groove and serves as an index for checking the wear level of the tread rubber.

Walls of the three main grooves 30, 31, and 32 are inclined such that the groove width gradually becomes narrower toward the groove bottom. The walls of the main grooves constitute the side walls of the blocks. Therefore, in other words, the side walls of the block are inclined such that the width of the block becomes wider as the distance from the ground contact surface increases.

The tread 10 has the first center block 40 defined by the main grooves 30 and 31 and the second center block 50 defined by the main grooves 30 and 32. The tread 10 also includes the first shoulder block 60 located to face the first center block 40 in the tire axial direction with the shoulder main groove 31 in between, and the second shoulder block 70 located to face the second center block 50 in the tire axial direction tire with the shoulder main groove 32 in between.

The first center block 40 and the second center block 50 are ribbed blocks that are continuous in the tire circumferential direction. In the present specification, the "ribbed block" means a block without a groove having a width greater than 2 mm. By adopting the ribbed blocks continuous in the tire circumferential direction as the first center block 40 and the second center block 50, the rigidity of the tread 10 is improved. As a result, wet performance and snow performance can be improved.

If wide grooves are present in the first center block 40 and the second center block 50, water flowing in the main grooves 30, 31, and 32 enters the grooves formed in the first center block 40 and the second center block 50, thereby generating a vortex in the water flowing in the main grooves 30, 31, and 32. This vortex may reduce the speed of water flow in the main grooves 30, 31, and 32, leading to degradation of drainage performance. For the pneumatic tire 1 of the present embodiment, such wide grooves are not formed in the first center block 40 or the second center block 50. Thus, a vortex is less likely to be generated in the water flowing in the main grooves 30, 31, and 32. Wet performance can thus be improved.

The first center block 40 and the second center block 50 are separated by the center main groove 30. Further, the first center block 40 is separated from the first shoulder block 60 by the shoulder main groove 31, and the second center block 50 is separated from the second shoulder block 70 by the shoulder main groove 32. In the present embodiment, the first center block 40 and the second center block 50 have the same width. Further, the first shoulder block 60 and the second shoulder block 70 have the same width. The width of the first shoulder block 60 and the second shoulder block 70 is formed to be wider than that of the first center block 40 and the second center block 50. The pneumatic tire 1 has excellent performance not only on dry roads but also on wet roads and snowy and icy roads. It is thus suitable as an all-season tire.

Hereinafter, the center blocks 40 and 50 and the shoulder blocks 60 and 70 that constitute the tread 10 will be explained in more detail with reference to FIG. 2.

[First Center Block 40]

The first center block 40 is formed straight along the tire circumferential direction and has a constant width along its entire length. The width of the ground contact surface of the first center block 40 corresponds to, for example, 12% to 25% of the ground contact width of the tire. When the width of the first center block 40 is within this range, the steering stability is improved. For example, the width of the first center block 40 is 15 mm or more and 35 mm or less.

The first center block 40 has a plurality of sipes 41 formed therein at intervals in the tire circumferential direction. In the present specification, the sipe is defined as a narrow groove with a groove width of 2.0 mm or less. The width of the sipe is, for example, 0.5 mm or more and 1.5 mm or less, or 0.5 mm or more and 1.0 mm or less. The sipes 41 contribute to improving wet performance and snow performance. Although the first center block 40 may also have other sipes with different shapes from the sipes 41, it only has the sipes 41 in the present embodiment. Each sipe 41 has substantially the same shape. The number of sipes crossing the first center block 40 is greater than the number of sipes crossing the second center block 50 (described in detail below).

For example, the sipes 41 may be formed at a variable pitch with slightly varying intervals between the sipes in units of a predetermined number of sipes in the tire circumferential direction, or may be formed at the same intervals. The interval between the adjacent sipes 41 in the tire circumferential direction is, for example, smaller than the width of the center main groove 30 and is 5 mm or more and 30 mm or less. Furthermore, the interval between the sipes 41 is smaller than the interval between the sipes formed in the second center block 50.

In a plan view of the first center block 40, the sipe 41 has a curved portion 42 that protrudes to one side in the tire circumferential direction relative to both ends of that sipe in the length direction. The curved portion 42 allows the sipes 41 to exhibit the edge effect to thereby achieve excellent braking performance. During braking, the ground contact area becomes larger in the first region 10A on the inner side of the vehicle, and thus, forming a larger number of sipes 41 in the center block 40 increases the edge effect and substantially improves braking performance on snowy and icy road surfaces. Furthermore, the curved sipes 41 increase lateral edge components and improve the steering stability when the vehicle turns.

The sipes 41 are sipes that cross the first center block 40. The sipes 41 cross the first center block 40 and communicate with the main grooves 30 and 31, and thus, the number of channels through which air flows increases in the center portion of the tread 10 in the tire axial direction. This makes it possible to disperse the frequency of air columnar resonance which is generated during traveling, thereby reducing pattern noise.

The depth of the sipe 41 is, for example, 60% to 90% of the depth of the center main groove 30 at its deepest portion. The depth of the sipe 41 may be shallower in a predetermined length range from both ends of that sipe 41 in the length direction than in its other parts. This makes it possible to reduce a decrease in rigidity of the first center block 40 due to the formation of the sipes 41, thereby improving the steering stability. The predetermined length range is, for example, a length range corresponding to 3% to 10% of the width of the first center block 40.

[Second Center Block 50]

As described above, the second center block 50 is formed straight along the tire circumferential direction so as to face the first center block 40 in the tire axial direction with the center main groove 30 in between. The width of the ground contact surface of the second center block 50 is, for example, 12% to 25% of the ground contact width of the tire. When the width of the second center block 50 is within this range, the steering stability is improved. In the present embodiment, the second center block 50 has the same width as the first center block 40 and has a constant width along its entire length.

The second center block 50 has a plurality of first sipes 51 formed therein at intervals in the tire circumferential direction. The plurality of first sipes 51 may be formed at a variable pitch with slightly varying intervals between the sipes in units of a predetermined number of sipes in the tire circumferential direction, or may be formed at the same intervals. Although only the first sipes 51 may be formed in the second center block 50, in the present embodiment, three other types of sipes (second sipes 52, third sipes 53, and fourth sipes 54) are formed in addition to the first sipes 51.

The first sipes 51 are sipes that cross the second center block 50 to thereby connect between the main grooves 30 and 32. Preferably, the first sipe 51 is generally S-shaped in a plan view of the second center block 50. This allows the first sipes 51 to exhibit the edge effect to thereby significantly improve snow performance.

The second center block 50 has regions in each of which a second sipe group consisting of second sipes 52 and a third sipe group consisting of third sipes 53 overlap the first sipe 51 in the tire axial direction. The second sipes 52 extend from the center main groove 30 and terminate within the block, and the third sipes 53 extend from the shoulder main groove 32 and terminate within the block. The second sipes 52 and the third sipes 53 are short sipes formed at a predetermined distance from the first sipe 51. Each of the second sipes 52 and the third sipes 53 is inclined at a predetermined angle with respect to the tire axial direction and the circumferential direction.

In the present embodiment, the second sipe group that overlaps one first sipe 51 in the tire axial direction includes three second sipes 52. The three second sipes 52 are, for example, formed parallel to each other at equal intervals. Similarly, the third sipe group includes three third sipes 53 that are formed parallel to each other at equal intervals. The second sipes 52 constituting the second sipe group have different lengths, and the closer the sipes are to the first sipe 51, the longer the sipes are. In addition, the third sipes 53 constituting the third sipe group have different lengths, and the closer the sipes are to the first sipe 51, the longer the sipes are.

More specifically, the second sipes 52 extending from the center main groove 30 are longer in a part where the first sipe 51 protrudes in the direction of the shoulder main groove 32 and shorter in a part where the first sipe 51 protrudes in the direction of the center main groove 30. The third sipes 53 extending from the shoulder main groove 32 are longer in the part where the first sipe 51 protrudes in the direction of the center main groove 30 and shorter in the part where the first sipe 51 protrudes in the direction of the shoulder main groove 32. This makes it possible to improve rigidity balance of the second center block 50 and achieve more reliable tire performance.

The second center block 50 also has substantially linear fourth sipes 54 each crossing the second center block 50 in a region between the first sipes 51. That is, in the second center block 50, the first sipes 51 and the fourth sipes 54 are arranged alternately in the tire circumferential direction. The fourth sipes 54 are formed parallel to the second sipes 52 and the third sipes 53 and extend straight without being curved in the middle.

The fourth sipes 54 play an important role in noise reduction. Specifically, the fourth sipe 54 communicates with the main grooves 30 and 32, thereby increasing the number of channels through which air flows. This makes it possible to disperse the frequency of air columnar resonance which is generated during traveling, thereby reducing pattern noise.

The depth of the sipes formed in the second center block 50 may be the same. The depth of each of the sipes is, for example, 60% to 90% of the depth of the center main groove 30 at its deepest portion. In the present embodiment, the second sipes 52 and the third sipes 53, which are shorter in length, have a constant depth along their entire length. On the other hand, the depths of the first sipes 51 and the fourth sipes 54 are shallower in a predetermined length range from both ends of those sipes in the length direction than in their other parts. This makes it possible to reduce a decrease in rigidity of the second center block 50 due to the formation of sipes. The predetermined length range corresponds to, for example, 3% to 10% of the width of the second center block 50.

The number of sipes crossing the second center block 50 is preferably smaller than the number of sipes crossing the first center block 40. Although, in the first center block 40, all the sipes cross the block, in the second center block 50, the second sipes 52 and the third sipes 53 terminate within the block, and the first sipes 51 and the fourth sipes 54 cross the block. Further, the second center block 50 has larger intervals between the sipes in the tire circumferential direction than the first center block 40. Therefore, when the center blocks 40 and 50 are compared, the second center block 50 has a significantly smaller number of sipes that cross the block.

Additionally, even when the second sipe 52 and the third sipe 53 arranged in a straight line are counted as one, the number of sipes in the first center block 40 may be greater than that in the second center block 50. In this case, the number of sipes in the first center block 40 is, for example, 1.1 to 1.5 times the number of sipes in the second center block 50. Alternatively, even when a pair of second sipe 52 and third sipe 53 is counted as one sipe, the number of sipes in the first center block 40 may be greater than the number of sipes in the second center block 50. Setting the number of sipes in the first center block 40 to be greater than the number of sipes in the second center block 50 makes it possible to disperse the frequency of air columnar resonance generated during traveling, thereby reducing pattern noise. It also makes it possible to achieve both braking performance and steering stability at a higher level.

[First Shoulder Block 60]

The first shoulder block 60 is formed straight along the tire circumferential direction so as to face the first center block 40 in the tire axial direction with the shoulder main groove 31 in between. The width of the ground contact surface of the first shoulder block 60 is, for example, 15% to 35% of the ground contact width of the tire and is greater than the width of the ground contact surface of the first center block 40. In the present embodiment, the first shoulder block 60 has the same width as the second shoulder block 70 and has a constant width along its entire length.

The first shoulder block 60 has two types of lateral grooves 61 and 62 having different lengths. The lateral grooves 61 and 62 extend in the tire axial direction and are connected to the shoulder main groove 31. Each of the lateral grooves has a length from the shoulder main groove 31 to beyond the ground edge E1 so as to cross the ground contact surface of the first shoulder block 60. The lateral grooves 61 and 62 have a width of more than 2 mm and are thus distinguished from the sipes, which are thin linear grooves. As described above, the ground contact surface of the first shoulder block 60 is divided by the lateral grooves 61 and 62 in the tire circumferential direction.

In the present specification, the expression that the lateral grooves "extend in the tire axial direction" is intended to mean both that the lateral grooves extend along the axial direction of the tire, and that the lateral grooves extend at an inclination angle of 45° or less, preferably 30° or less, with respect to the tire axial direction. This also applies to the main grooves extending in the tire circumferential direction. The main grooves may be formed in a zigzag shape with curves at an inclination angle of 45° or less with respect to the tire circumferential direction.

The lateral grooves 61 and 62 have, for example, a constant width from the shoulder main block 31 to the ground contact end E1. By connecting the lateral grooves 61 and 62 to the shoulder main groove 31, drainage performance is improved, and wet performance is enhanced significantly. As the lateral grooves 61 and 62 are communicated with the shoulder main groove 31, air flows from the shoulder main groove 31 into the lateral grooves 61 and 62. Although it is assumed that this would result in increase in noise and air resistance, the first shoulder block 60 is located on the inner side of the vehicle, and thus, the influence from the lateral grooves 61 and 62 is small. The lateral groove 62 is formed in a straight line along its entire length. The lateral groove 61 is formed in a straight line to a position beyond the ground contact end E1 and curved to one side in the tire circumferential direction at or near the boundary with the sidewall 12.

The first shoulder block 60 has a region between the lateral grooves 61 and 62 where two types of sipes having different lengths (first sipe 63 and second sipe 64) are formed. Both of the sipes have lengths from the shoulder main groove 31 to beyond the ground contact end E1 and are connected to each other at the shoulder of the pneumatic tire 1. The second sipe 64 is longer than the first sipe 63 and has the same length as the lateral groove 62. In the first shoulder block 60, the grooves and the sipes are repeatedly formed in the order of the lateral groove 61, the first sipe 63, the second sipe 64, and the lateral groove 62 in the tire circumferential direction. The grooves and the sipes are formed, for example, at a variable pitch.

The lateral grooves 61 and 62, the first sipe 63, and the second sipe 64 are formed substantially parallel to each other and are inclined with respect to the tire axial direction. The angle of inclination of the lateral grooves and the sipes is smaller than that of the sipes in the center blocks 40 and 50, for example.

[Second Shoulder Block 70]

The second shoulder block 70 is formed straight along the tire circumferential direction so as to face the second center block 50 in the tire axial direction with the shoulder main groove 32 in between. The width of the ground contact surface of the second shoulder block 70 is, for example, 20% to 35% of the ground contact width of the tire and is greater than that of the second center block 50. The second shoulder block 70 has no groove that crosses the ground contact surface of the block. The second shoulder block 70 is continuous in the tire circumferential direction.

The second shoulder block 70 is similar to the first shoulder block 60 in that it has lateral grooves 71 and 72, first sipes 73, and second sipes 74 that extend in the tire axial direction. The lateral groove 71 which is the longer groove, is curved at or near the boundary with the sidewall 12 in the direction opposite to the curve direction of the lateral groove 61 in the first shoulder block 60. In the second shoulder block 70, the grooves and the sipes are repeatedly formed in the order of the lateral groove 71, the second sipe 74, the first sipe 73, and the lateral groove 72 in the tire circumferential direction. The second shoulder block 70 differs from the first shoulder block 60 in that the lateral grooves 71 and 72 are not directly connected to the shoulder main groove 32.

In the present embodiment, the lateral grooves 71 and 72 are connected to the shoulder main groove 32 via third sipes 75. This makes it possible to prevent air from flowing into the lateral grooves 71 and 72 from the shoulder main groove 32 and from being released to the outside of the vehicle, thereby reinforcing the noise reduction effect. It also makes it possible to reduce the air resistance of the pneumatic tire 1 effectively. The grooves in the second shoulder block 70 on the outer side of the vehicle have a greater effect on reduction of noise and air resistance than the grooves in the first shoulder block 60 on the inner side of the vehicle. Although the length of the third sipe 75 is not particularly limited, in a preferable example, it has a length of 5% to 40% or 10% to 30% of the width of the ground contact surface of the second shoulder block 70. The third sipes 65 may have the same length, for example.

Figure 3:
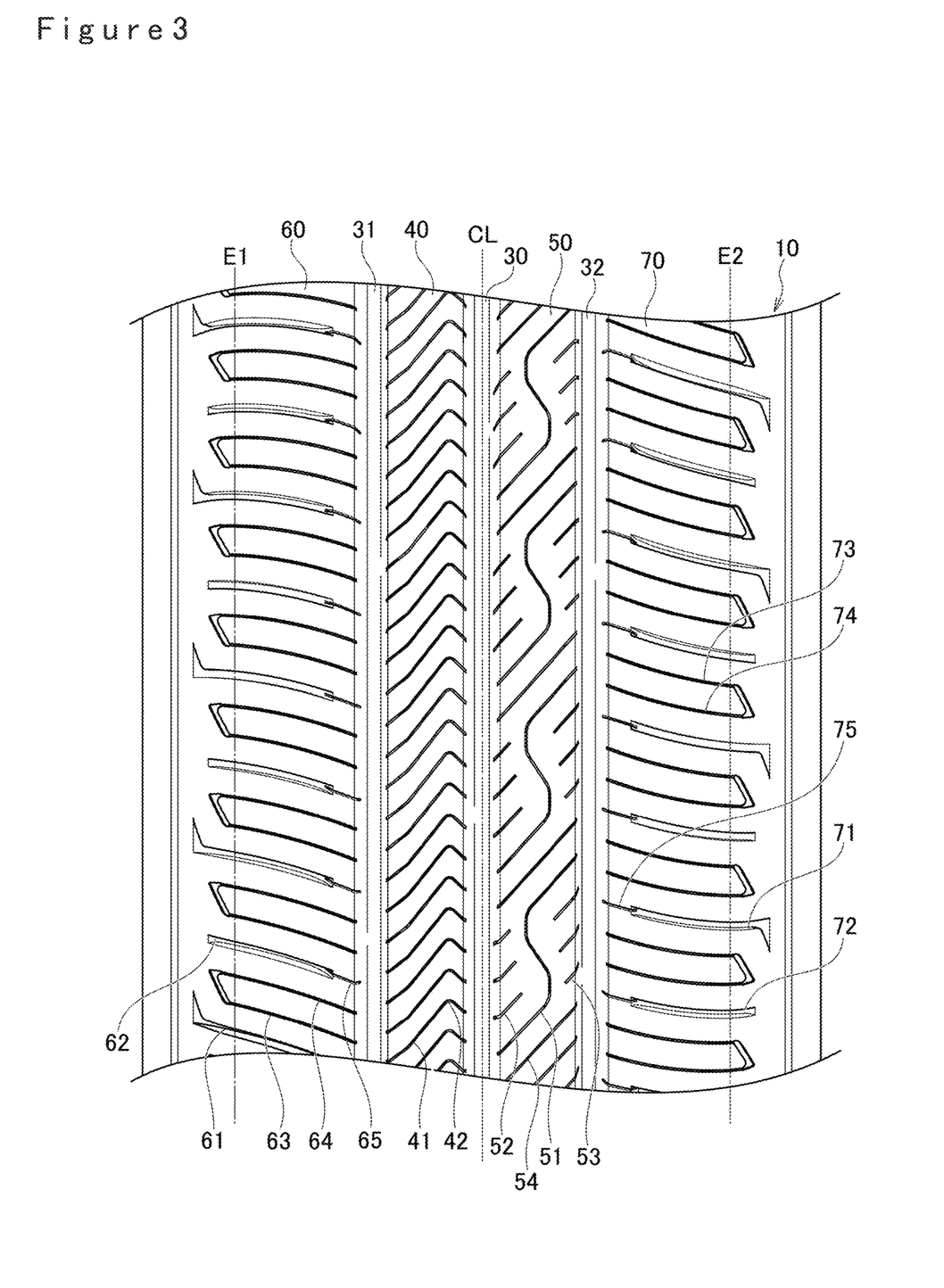
FIG. 3 is an enlarged plan view of a part of a tread of a pneumatic tire according to another embodiment.

Further, as illustrated in FIG. 3, the lateral grooves 61 and 62 formed in the first shoulder block 60 may be connected to the shoulder main groove 31 via the third sipes 65, similarly to the lateral grooves 71 and 72 in the second shoulder block 70. That is, although, in the tread pattern illustrated in FIG. 2, the left and right shoulder blocks 60 and 70 have the different forms of connection between the lateral grooves and the main grooves, in the tread pattern illustrated in FIG. 3, the shoulder blocks 60 and 70 have the same form of connection between the lateral grooves and the main grooves. The length, the width, the depth, and the like of the third sipe 65 may be substantially the same as the third sipe 75 in the second shoulder block 70.

EXAMPLES

Although examples will be explained below, the present invention is not limited to these examples.

In the first mixing stage, compounding agents other than sulfur and the vulcanization accelerator were first added to a rubber component according to the blending amounts (parts by mass) shown in Table 1 below and kneaded (discharge temperature=160° C.) using a Banbury mixer. Then, in the final mixing stage, sulfur and the vulcanization accelerator were added to the resulting kneaded product and kneaded (discharge temperature=90° C.) to prepare the rubber composition. The details of the components listed in Table 1 are as follows:

SBR1: "HPR355" (modified solution polymerized SBR with Tg=−21° C.) manufactured by ENEOS Material Corporation SBR2: "HPR850" (modified solution polymerized SBR with Tg=−24° C.) manufactured by ENEOS Material Corporation SBR3: "HPR350" (modified solution polymerized SBR with Tg=−32° C.) manufactured by ENEOS Material Corporation SBR4: "HPR840" (modified solution polymerized SBR with Tg=−60° C.) manufactured by ENEOS Material Corporation SBR5: "Tuf1834" (solution polymerized SBR with Tg=−68° C.) manufactured by Asahi Kasei Corp.

SBR6: "SBR0122" (unmodified ESBR with Tg=−40° C.) manufactured by ENEOS Materials Corporation BR: "BR150B" manufactured by UBE Corporation

NR: RSS #3

Carbon black 1: "Seast 6" manufactured by Tokai Carbon Co., Ltd.

Carbon black 2: "Seast KH" manufactured by Tokai Carbon Co., Ltd.

Silica: "Ultrasil VN3" manufactured by Evonik Industries AG

Silane Coupling Agent: "Si75" manufactured by Evonik Industries AG

Oil 1: aroma oil "Process NC140" manufactured by JX Nippon Oil & Energy Corporation Oil 2: aroma oil "Process P200" manufactured by JX Nippon Oil & Energy Corporation Resin: "Petrotac 90" C5/C9 aliphatic/aromatic copolymerized hydrocarbon resin (glass transition temperature: 65° C., softening point: 95° C.) manufactured by Tosoh Corporation Stearic acid: "Lunak S-20" manufactured by Kao Corporation Zinc oxide: "Zinc Oxide Type 3" manufactured by Mitsui Mining and Smelting Co., Ltd.

Wax: "OZOACE0355" manufactured by Nippon Seiro Co., Ltd.

Anti-aging agent 1: "Noclac 6C" manufactured by Ouchi Shinko Chemical Industrial Co., Ltd.

Anti-aging agent 2: "Antage RD" manufactured by Kawaguchi Chemical Industry Co., Ltd.

Vulcanization Accelerator 1: "Nocceler D" manufactured by Ouchi Shinko Chemical Industrial Co., Ltd.

Vulcanization Accelerator 2: "SOXINOL CZ" manufactured by Sumitomo Chemical Company Limited Sulfur: "Powdered Sulfur" manufactured by Tsurumi Chemical Industry Co., Ltd.

The unvulcanized rubber compositions of Examples 1 to 7 and Comparative Examples 1 and 2 in Table 1 were vulcanized at 160° C. for 30 minutes to prepare test pieces having a predetermined shape, and their hardness and viscoelastic properties were evaluated. The following evaluation methods were used.

<Hardness Measurement>

In accordance with JIS K6253, the hardness Hs was measured for each rubber test piece at a temperature of 23° C. by using a Durometer Type A (Model: GS-719N, manufactured by Teclock Co., Ltd.).

<Dynamic Viscoelasticity Measurement>

−25° C. E' (MPa), 0° C. tan δ, and 35° C. tan δ were measured for each rubber test piece by using a viscoelasticity tester manufactured by Toyo Seiki Co., Ltd. in accordance with JIS K6394. The measurement conditions were as follows:

−25° C. E: Measurement temperature −25° C., initial strain 10%, dynamic strain 1%, frequency 10 Hz, 0° C. tan δ: Measurement temperature 0° C., initial strain 10%, dynamic strain 1%, frequency 10 Hz, and 35° C. tan δ: measurement temperature 35° C., initial strain 10%, dynamic strain 1%, frequency 10 Hz.

The unvulcanized rubber compositions of Examples 1 to 7 and Comparative Examples 1 and 2 in Table 1 were used for tread rubbers. The tread rubbers were vulcanized and molded according to a conventional method to prepare test pneumatic tires (tire size: 195/60R17 90H) with the tread pattern shown in FIG. 2. The test pneumatic tires were evaluated as follows.

<Wet Performance>

Each test tire was mounted on an FF vehicle with a displacement of 2000 cc, and the ABS was activated at a speed of 90 km/h on a wet road surface. The braking distance during deceleration to 20 km/h was measured (average value of n=10), and expressed as an index with Comparative Example 1 as 100. The greater the value, the shorter the braking distance and the better the braking performance.

<Snow Performance>

Each test tire was mounted on the FF vehicle with a displacement of 2000 cc, and the braking distance was measured and evaluated on a pressed snow road with ABS activated at a speed of 40 km/h. In Table 1, "O" indicates excellent snow performance, and "X" indicates inferior snow performance compared to "O".

TABLE 1

|  |  | EXAMPLE 1 | EXAMPLE 2 | EXAMPLE 3 | EXAMPLE 4 | EXAMPLE 5 | EXAMPLE 6 | EXAMPLE 7 | COMPARATIVE EXAMPLE 1 | COMPARATIVE EXAMPLE 2 |
|---|---|---|---|---|---|---|---|---|---|---|
| BLENDING AMOUNT (PARTS BY MASS) | SBR1 |  |  |  |  | 32 |  |  |  |  |
|  | SBR2 | 17 | 50 | 50 | 50 |  | 17 | 18 | 18 | 18 |
|  | SBR3 |  |  |  |  |  | 35 |  |  |  |
|  | SBR4 | 53 |  |  |  |  |  | 35 | 35 | 35 |
|  | SBR5 |  |  |  |  |  |  | 26 | 26 |  |
|  | SBR6 |  |  |  |  | 12 |  |  |  | 26 |
|  | BR |  | 21 | 21 | 21 | 31 | 17 |  |  |  |
|  | NR | 30 | 29 | 29 | 29 | 25 | 31 | 21 | 21 | 21 |
|  | CARBON BLACK 1 | 6 | 6 | 3 | 3 | 15 | 6 | 4 | 4 | 4 |
|  | CARBON BLACK 2 |  |  | 1 | 1 |  |  |  |  |  |
|  | SILICA | 85 | 66 | 67 | 67 | 70 | 77 | 80 | 80 | 80 |
|  | SILANE COUPLING AGENT | 6.0 | 4.6 | 4.7 | 4.7 | 4.9 | 5.4 | 5.6 | 5.6 | 5.6 |
|  | OIL 1 | 12 | 10 | 10 | 10 | 25 | 25 | 20 | 15 | 15 |
|  | OIL 2 | 9 |  |  |  |  |  | 4 | 9 | 9 |
|  | RESIN | 10 |  |  |  |  |  | 10 | 10 | 10 |
|  | STEARIC ACID | 2.0 | 2.0 | 2.0 | 2.0 | 2.0 | 2.0 | 2.0 | 2.0 | 2.0 |
|  | ZINC OXIDE | 2.0 | 2.0 | 2.0 | 2.0 | 2.0 | 2.0 | 2.0 | 2.0 | 2.0 |
|  | WAX | 2.0 | 2.0 | 2.0 | 2.0 | 2.0 | 2.0 | 2.0 | 2.0 | 2.0 |
|  | ANTI-AGING AGENT 1 | 2.0 | 2.0 | 2.0 | 2.0 | 2.3 | 2.0 | 2.0 | 2.0 | 2.0 |
|  | ANTI-AGING AGENT 2 | 0.7 | 0.7 | 0.7 | 0.7 | 0.7 | 0.7 | 0.7 | 0.7 | 0.7 |
|  | VULCANIZATION ACCELERATOR 1 | 2.3 | 1.8 | 1.8 | 1.8 | 1.5 | 2.0 | 2.3 | 2.3 | 2.3 |
|  | VULCANIZATION ACCELERATOR 2 | 2.1 | 1.5 | 1.5 | 1.5 | 1.9 | 2.1 | 2.1 | 2.1 | 2.1 |
|  | SULFUR | 1.6 | 1.6 | 1.6 | 1.6 | 1.4 | 1.6 | 1.6 | 1.6 | 1.6 |
| PHYSICAL PROPERTY | HARDNESS (23° C. Hs) | 60 | 60 | 62 | 60 | 65 | 62 | 59 | 58 | 59 |
|  | STORAGE ELASTIC MODULUS (−25° C. E') | 90 | 93 | 110 | 105 | 85 | 92 | 66 | 53 | 167 |
|  | −25° C. E'/23° C. Hs | 1.50 | 1.54 | 1.79 | 1.77 | 1.31 | 1.48 | 1.11 | 0.92 | 2.84 |
|  | LOSS TANGENT (0° C. tanδ) | 0.277 | 0.296 | 0.290 | 0.308 | 0.221 | 0.252 | 0.249 | 0.237 | 0.348 |
|  | LOSS TANGENT (35° C. tanδ) | 0.181 | 0.149 | 0.171 | 0.164 | 0.231 | 0.180 | 0.173 | 0.157 | 0.172 |
|  | 0° C. tanδ/35° C. tanδ | 1.53 | 1.99 | 1.70 | 1.88 | 0.96 | 1.40 | 1.44 | 1.51 | 2.03 |
| EVALUATION | WET PERFORMANCE | 101 | 100 | 99 | 102 | 100 | 99 | 101 | 100 | 107 |
|  | SNOW PERFORMANCE | ○ | ○ | ○ | ○ | ○ | ○ | ○ | ○ | x |

The results are shown in Table 1. As shown in Table 1, the pneumatic tires in which −25° C. E' of the rubber composition constituting the tread rubber is 60 MPa or more and 150 MPa or less have both wet performance and snow performance in a well-balanced manner.

Although the embodiments of the present invention have been described, these embodiments are presented as examples and are not intended to limit the scope of the invention. These embodiments can be implemented in various other forms, and various omissions, replacements, and changes can be made without departing from the gist of the invention. These embodiments and modifications thereof are included in the scope and gist of the invention as well as the invention described in the claims and the equivalent scope thereof.

The invention claimed is:

1. A pneumatic tire mounted on a vehicle in a specified direction, the pneumatic tire comprising a tread rubber on a tread, and
the tread rubber comprising:
   a plurality of main grooves that extend along a tire circumferential direction,
   a pair of shoulder land portions that are defined by the main grooves and arranged on outer sides in a tire axial direction, and
   a center rib that is located between the pair of shoulder land portions, the center rib being continuous in the tire circumferential direction, wherein the tread rubber has a storage modulus at −25° C. (−25° C. E') of 60 MPa or more and 150 MPa or less;
wherein the center rib includes:
   a first center rib located on an inner side of the vehicle relative to a tire equator, and
   a second center rib located on an outer side of the vehicle relative to the tire equator, and
a plurality of sipes formed in and crossing the first center rib at intervals in the tire circumferential direction, a plurality of sipes formed in and crossing the second center rib at intervals in the tire circumferential direction,
   wherein each sipe of the plurality of sipes crossing the first center rib has a curved portion that protrudes to one side in the tire circumferential direction relative to positions of both ends of the sipe in the first center rib in the tire circumferential direction in a plan view of the first center rib;

wherein each sipe of the plurality of sipes crossing the second center rib is generally S-shaped in the plan view of the second center rib; and wherein a number of sipes crossing the second center rib is smaller than a number of sipes crossing the first center rib.

2. The pneumatic tire according to claim 1, wherein a total width of the main grooves is greater than 3% and less than or equal to 30% of a ground contact width of the tire.

3. The pneumatic tire according to claim 1, wherein the main grooves include:
　a pair of shoulder main grooves that are arranged on the outer sides in the tire axial direction, and
　a center main groove that is located between the pair of shoulder land portions, and wherein:
　the first center rib is defined by one of the pair of the shoulder main grooves and the center main groove, and
　the second center rib is defined by the other of the pair of the shoulder main grooves and the center main groove.

4. The pneumatic tire according to claim 1, wherein the shoulder land portions include:
　a first shoulder land portion that is located on an inner side of the vehicle relative to a tire equator, and
　a second shoulder land portion that is located on an outer side of the vehicle relative to the tire equator,
　the second shoulder land portion has a lateral groove extending in the tire axial direction, and
　the lateral groove is connected to the shoulder main groove via a sipe.

\* \* \* \* \*